United States Patent [19]

Tsuji et al.

[11] Patent Number: 5,664,035

[45] Date of Patent: Sep. 2, 1997

[54] BIDIRECTIONAL OPTICALLY POWERED SIGNAL TRANSMISSION APPARATUS

[75] Inventors: Nobuhiko Tsuji, Kanagawa; Naoki Kaiho, Tokyo; Yasukazu Sano, Kanagawa, all of Japan

[73] Assignee: Fuji Electric Co., Ltd., Kawasaki, Japan

[21] Appl. No.: 419,141

[22] Filed: Apr. 10, 1995

[30] Foreign Application Priority Data

Apr. 8, 1994 [JP] Japan .................................. 6-070353

[51] Int. Cl.⁶ .......................................... G02B 6/293
[52] U.S. Cl. ...................... 385/24; 359/173; 359/152
[58] Field of Search ........................... 385/15, 24, 27, 385/31; 359/152, 154, 158, 159, 164, 167, 171, 173

[56] References Cited

U.S. PATENT DOCUMENTS

| | | | |
|---|---|---|---|
| 4,325,137 | 4/1982 | Yoshikazu | 359/171 |
| 4,596,051 | 6/1986 | Feldman | 359/152 |
| 4,727,535 | 2/1988 | Brandt | 359/152 X |
| 4,973,169 | 11/1990 | Slonecker | 385/24 X |
| 5,068,541 | 11/1991 | Kondo | 250/559.07 |

*Primary Examiner*—John D. Lee
*Attorney, Agent, or Firm*—Morrison Law Firm

[57] ABSTRACT

A bidirectional optically powered signal transmission apparatus includes a control station and a field station which are optically linked by an optical fiber. The control station sends a first light beam to a light receiver in the field station. The field station sends a second light beam to the control station. The first and second light beams are at different wavelengths so that simultaneous bidirectional transmission is enabled. The field station further converts a portion of the first light beam to electric power for powering the field station. The field station demodulates an AC component superimposed on the light it receives to produce an AC electric signal for control of the field station. Optical transmitting and receiving functions in the field station are preferably combined into an integrated opto-electric and electro-optic converter (O-E and E-O converter). The O-E and E-O converter is preferably an integrated circuit.

13 Claims, 7 Drawing Sheets

BIDIRECTIONAL OPTICALLY POWERED SIGNAL TRANSMISSION APPARATUS

BACKGROUND OF THE INVENTION

The present invention relates to an optically powered signal transmission apparatus which communicates bidirectionally between two stations, with electric power supplied from one to the other through a light beam.

Many optical transmission systems are known which transmit data through an optical fiber cable transmission network between two or more stations. Such systems offer enhanced data security, immunity to electromagnetic noise (EMI and RFI), and excellent explosion-proof properties. This latter feature makes such systems ideally suited for operating in potentially explosive atmospheres.

FIG. 7 is a block diagram showing a conventional optical signal transmission apparatus according to the prior art. A control station 10 controls two field stations 20 and 30. Field station 20 typically contains transducers and works as a sensor which measures temperature, pressure, etc. or works as an actuator which adjusts temperature, pressure, etc. Control station 10 includes an optical transceiver circuit 13a for use with field station 20. Control station 10 also includes an optical transceiver circuit 13b for use with field station 30. Field station 30 is identical to field station 20, and optical transceiver circuit 13b is identical to optical transceiver circuit 13a. The descriptions of field station 30 and optical transceiver circuit 13b are therefore omitted.

Optical transceiver circuit 13a includes a light source 131 for producing a light beam. The light beam passes through an optical light splitter-coupler 133' and an optical fiber 41 to field station 20. In field station 20, the light beam enters a light splitter-coupler 23' where it is reflected to a light receiver 221'. Light receiver 221' converts the optical signal to an electrical signal which is sent to a control circuit 21. Control circuit 21 is an interface with any type of transducer (not shown) or sensor (not shown) that are in field station 20. Control circuit 21 detects control data in the electric signal. Control circuit 21 controls a light source 222' for producing an outgoing light beam which passes through light splitter-coupler 23' and optical fiber 41. The light beam is reflected by optical light splitter-coupler 133' to a light receiver 132. Light receiver 132 converts the optical signal to an electrical signal which is sent to a control circuit 11. Control circuit 11 detects data produced by field station 20. Optical fiber 41 is connected to control station 10 by a connector 51a and to field station 20 by a connector 51b. A battery 27 powers field station 20.

Field stations 20, 30 are assumed to be placed in adverse environments, such as, for example, in dangerous areas in an oil refinery or chemical factory, in which a potentially explosive atmosphere exists. Because of this, battery 27 must be explosion-proof or meet intrinsic safety conditions for avoiding high voltages.

In addition, battery 27 must be replaced on a regular basis. Care must be taken in designing and locating field station 20 to facilitate battery replacement. The conventional optical signal transmission system is therefore subject to high material and labor costs for replacing batteries.

For these reasons, optically powered signal transmission systems have been developed which eliminate the need for a battery. Solar cells are used to convert light, transmitted through a power optical fiber, to electric power to power the field station. The return signal from the field station is normally carried over a separate signal optical fiber. This requires two optical fibers; the power optical fiber and the signal optical fiber.

Sensor systems are being developed which use one optical fiber for both power and signal. A power light beam is sent from a control station to a remote sensor over an optical fiber where part of the light is converted to electricity to power the sensor. The remainder of the light beam, after being modulated with a digital signal produced by the sensor output, returns to the control station via the same optical fiber. The amount of light converted to electric power is quite limited. In addition, optical fiber lengths are limited due to the necessity for the optical signal to return to the control station without undue attenuation. Another drawback to such systems is that the signal communication is one-way, from the sensor to the control station. Bidirectional communications requires either a battery at the field station or two cables, one for the power and one for the signal.

OBJECTS AND SUMMARY OF THE INVENTION

In view of the foregoing, an object of the present invention is to provide an optically powered signal transmission apparatus which overcomes the drawbacks and limitations of the prior art.

Another object of the present invention is to provide an optically powered signal transmission apparatus which provides both power and signal from a control station to a field station over an optical fiber.

A further object of the present invention is to provide an optically powered signal transmission apparatus which communicates bidirectionally between two stations without requiring a power source at both of the stations.

Briefly stated, a bidirectional optically powered signal transmission apparatus includes a control station and a field station which are optically linked by an optical fiber. The control station sends a first light beam to a light receiver in the field station. The field station sends a second light beam to the control station. The first and second light beams are at different wavelengths so that simultaneous bidirectional transmission is enabled. The field station further converts a portion of the first light beam to electric power for powering the field station. The field station demodulates an AC component superimposed on the light it receives to produce an AC electric signal for control of the field station. Optical transmitting and receiving functions in the field station are preferably combined into an integrated opto-electric and electro-optic converter (O-E and E-O converter). The O-E and E-O converter is preferably an integrated circuit.

According to an embodiment of the invention, a bidirectional optically powered signal transmission apparatus includes first and second optical transmission stations, first means, in the first optical transmission station, for sending a first light beam on an optical transmission path to the second optical transmission station, second means, in the first optical transmission station, for receiving a second light beam sent from the second optical transmission station, third means, in the second optical transmission station, for sending the second light beam to the first optical transmission station over the optical transmission path, fourth means, in the second optical transmission station, for receiving the first light beam sent from the first optical transmission station, the first light beam including an AC signal component and a DC power component, and means, in the second optical transmission station, for converting the DC power component of the first light beam to electric power for powering the second optical transmission station.

According to an embodiment of the invention, a bidirectional optically powered signal transmission apparatus includes first and second optical transmission stations, first light source means, in the first optical transmission station, for radiating a first light beam having a first predetermined wavelength over an optical transmission path, the first light beam including an AC signal component and a DC power component, driving means for regulating the AC signal component, a first light splitter-coupler for receiving a second light beam sent from the second optical transmission station, a first light receiver for converting the second light beam received from the first light splitter-coupler to a first electric signal, second light source means, in the second optical transmission station, for radiating the second light beam having a second predetermined frequency, a second light splitter-coupler for receiving the first light beam sent from the first optical transmission station, a second light receiver for converting the AC signal component of the first light beam to a second electric signal, means, in the second optical transmission station, for converting the DC component of the first light beam to substantially DC electric power for powering the second optical transmission station and the second light source means, the second light receiver, and the means for converting being integrally formed as an O-E and E-O converter.

According to an embodiment of the invention, a bidirectional optically powered signal transmission apparatus includes a control station, means in the control station for superimposing an AC optical signal on a DC optical signal, a field station, means in the field station for converting a received optical signal to electrical power for powering the field station, means in the field station for demodulating the AC optical signal to produce an AC electrical signal, optical signal means in the field station for generating a further optical signal, and the electrical power being sufficient to satisfy all electrical power needs of the field station including the optical signal means.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
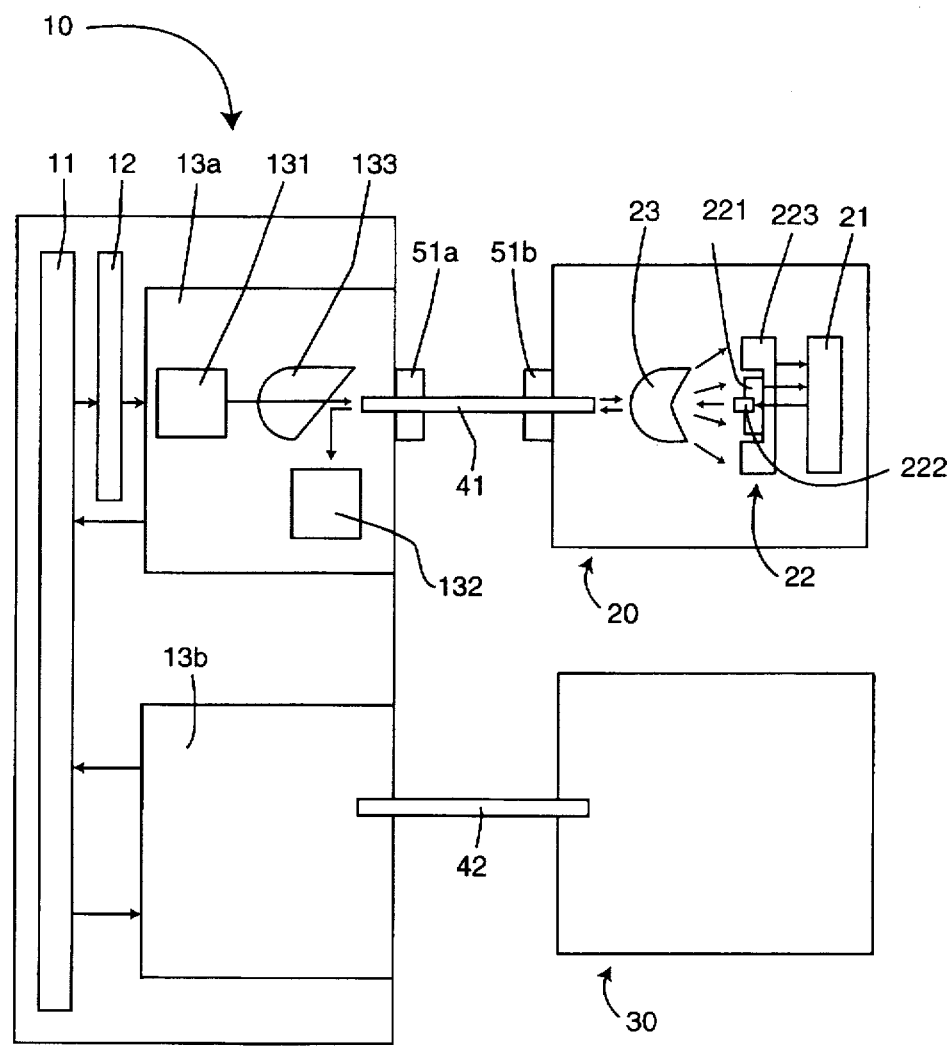
FIG. 1 shows a block diagram of an optical signal transmission apparatus according to the present invention.
Figure 2A:
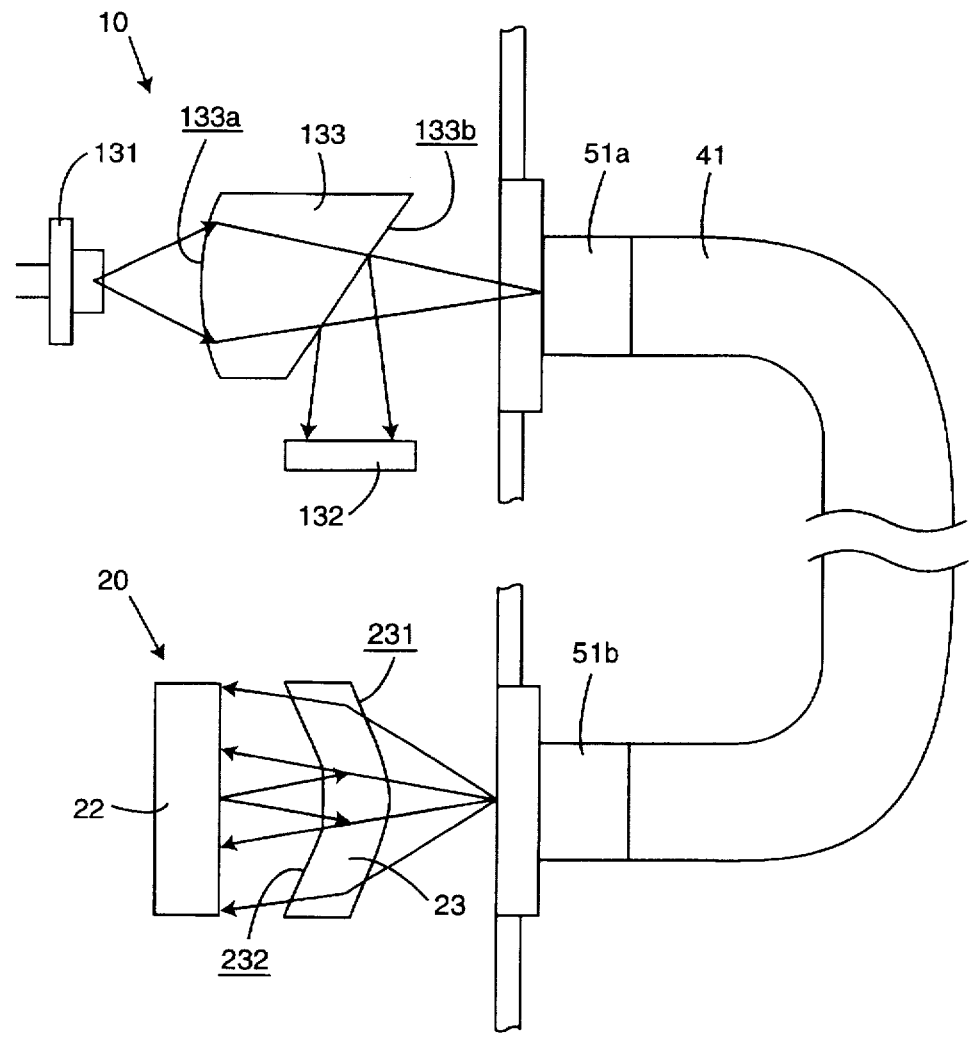
FIG. 2a shows a diagram of an optical transceiver circuit according to a first embodiment of the present invention.

Referring to FIGS. 1 and 2a, an optically powered signal transmission apparatus includes a control station 10 as an optically power supplying side, and field station 20 as an optically powered side. Since field station 30 is the same as field station 20, further description of field station 30 is omitted. An optical transceiver circuit 13a in control station 10 transmits and receives signal light to and from field station 20. Optical transceiver circuit 13a is controlled by a control circuit 11 through a driver circuit 12. Control station 10 and field station 20 are connected by an optical fiber 41. Optical fiber 41 is affixed to control station 10 and field station 20 by connectors 51a, 51b.

Optical transceiver circuit 13a includes a light source 131 which sends a light beam consisting of both signal light and power light to field station 20. Unless otherwise stated, hereinafter "light" or "light beam" refer to the combined signal light and power light emitted by light source 131. The light beam is converged and filtered through a light splitter-coupler 133. Light splitter-coupler 133 includes a positive lens 133a and an optical wavelength selection filter film 133b. Light-splitter 133 is coupled to optical fiber 41 via connector 51a, from which the light beam is transmitted to field station 20.

Field station 20 includes an integrated opto-electric and electro-optic converter (hereinafter referred to as "integrated O-E and E-O converter") 22 which converts an optical signal to an electrical signal and vice versa. A control circuit 21 controls integrated O-E and E-O converter 22, and controls the reception and sending of signals. Integrated O-E and E-O converter 22 includes a light source 222 which sends signal light to control station 10, a light receiver 221 which receives signal light from control station 10, and a light receiving array 223 which converts power light sent from control station 10 to electric power.

In field station 20, the light beam sent from control station 10 is relayed through connector 51b, converged in light splitter-coupler 23, and distributed onto integrated O-E and E-O converter 22. In integrated O-E and E-O converter 22, light receiver 221 converts the signal component of the light beam to an electric signal. The electric signal is fed to control circuit 21 which detects control data in the electric signal.

Light receiving array 223 converts the power component of the light beam to electric power for powering all the instruments and devices of field station 20 such as, for example, light source 222, control circuit 21. Light source 131 is any conventional source of light, such as a light emitting diode or a laser diode which preferably has a center emission wavelength suitable for low-loss transmission through optical fiber 41 such as, for example, about 780 nm. A light splitter-coupler 133 in optical transceiver circuit 13a functions as both a positive lens and a light splitter. A light receiver 132 converts the signal light reflected to it from light splitter-coupler 133 to an electric signal. The electric signal is sent to control circuit 11. It is preferable to use an optical wavelength selection filter fill 133b tuned to the operating light wavelength for the light splitter-coupler 133 to improve signal to noise ratio of the signal received in light receiver 132. Alternatively, an optical beam splitter with no wavelength dependence, such as a partially reflecting mirror, may be used for light splitter-coupler 133. The function of positive lens 133a is then performed by a separate refracting or reflecting element (not shown).

Figure 3:
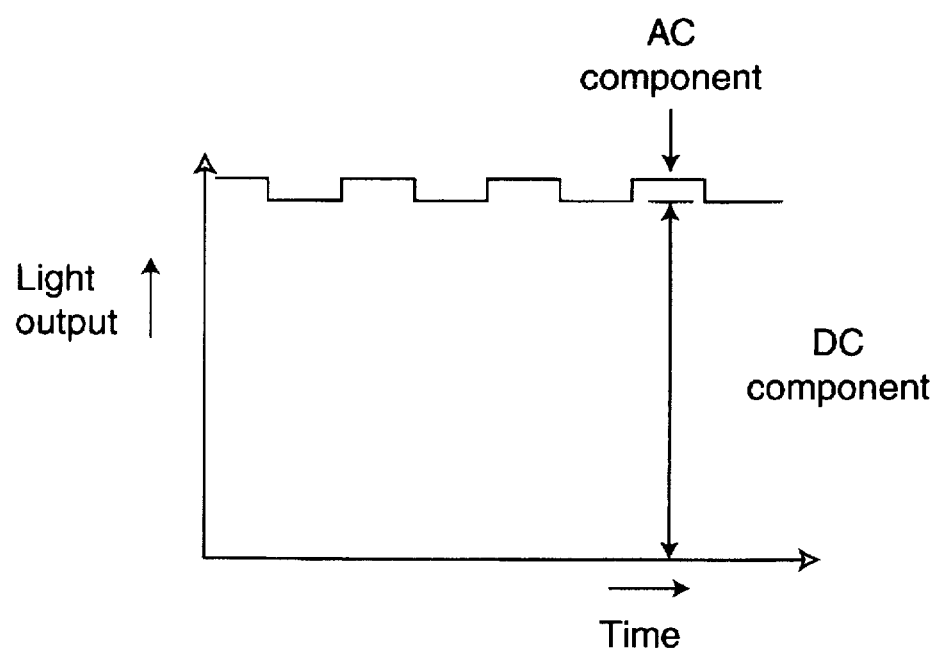
FIG. 3 shows a curve representing the amplitude of light sent from a control station according to the apparatus shown in FIG. 1.

Light source 131 sends the signal light and the power light to field station 20 as a combined light output. As shown in FIG. 3, a DC power component is the predominant output emitted from light source 131. The DC component is used for optical power transmission. An AC signal component is superimposed on the DC power component. The AC component contains the data. Driver circuit 12 drives light source 131 with a current effective to superimpose the AC signal component on the DC power component.

Referring again to FIGS. 1 and 2a, field station 20 transmits signal light to control station 10 as follows. Light source 222 is preferably a light emitting diode or a laser diode, which preferably has a center emission wavelength that is different from the center emission wavelength of light source 131 of control station 10. The center emission wavelength of light source 222 is preferably about 850 nm. The difference between the center emission wavelengths enables simultaneous bidirectional transfer of optical data transmission on a common optical fiber.

Field station 20 sends signal light from light source 222 of integrated O-E and E-O converter 22 to light splitter-coupler 23, where it is converged and coupled to optical fiber 41 for transmission to control station 10. In control station 10, the transmitted signal light is relayed through connector 51a and reflected from optical wavelength selection filter film 133b of light splitter-coupler 133 onto light receiver 132. Light receiver 132 converts the signal light to an electric signal which is sent to control circuit 11. Control circuit 11 detects the data measured by field station 20 such as temperature, pressure, etc. from the electric signal.

Figure 2B:
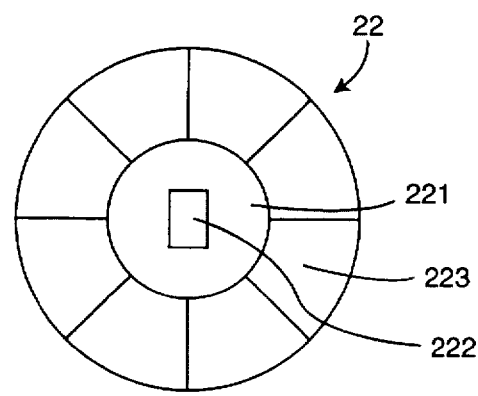
FIG. 2b shows an integrated O-E and E-O converter according to the first embodiment of the present invention.

Referring now to FIG. 2b, light receiver 221 and light source 222 are arranged in a central part of and integrated with the surrounding light receiving array 223 into an integrated O-E and E-O converter. Light receiving array 223 includes a plurality of photo electric arrays or elements The arrays or elements are interconnected in a manner effective to generate a voltage high enough to supply the electric power consumed in field station 20 and to drive all the instruments and devices of field station 20. In the preferred embodiment, the arrays or elements are connected in series, but may be connected in some series-parallel arrangement.

Light receiver 221 of integrated O-E and E-O converter 22 may include, for example, a compound semiconductor thin film containing gallium arsenide (GaAs), silicon (Si), etc. It is preferable to use gallium arsenide thin film which exhibits a higher rate of energy conversion at thinner film thicknesses than silicon. (See, T. Imai, "Compound Semiconductor Device", Kogyou Chosakai Publishing Co. Ltd., 1985, pp 314–315.)

Semiconductor compounds of the III–V group including gallium arsenide are preferably used for light sources. Silicon is preferably used for light receivers and light receiver arrays. This combination imposes difficulties in forming a light source, a light receiver and a light receiver array on one substrate. (See, H. Matsueda "Physics of Optoelectronic Integrated Circuit", Shyokabou Publisher Co. Ltd., 1989, pp 244–246.) However, by using gallium arsenide for light receiver 221 and light receiving array 223 instead of silicon, light source 222, light receiver 221, and light receiving array 223 can be integrated easily into a single chip.

Referring to FIG. 2a, a positive lens face (or "positive lens") 231 on a side of light splitter-coupler 23 receives the light beam coming from connector 51b. Light splitter-coupler 23 distributes the received light beam at a constant ratio to light receiver 221 and light receiving array 223 through a truncated conical negative lens face (or "negative lens") 232 of integrated O-E and E-O converter 22.

Figure 5A:
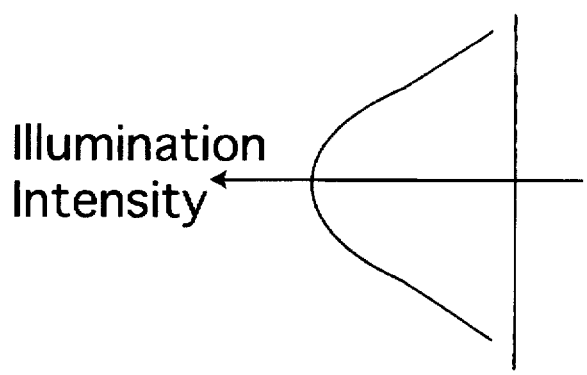
FIG. 5a shows an illumination intensity distribution of a far-field pattern of light emitted from an optical fiber.

Referring to FIG. 5a, an illumination intensity distribution of a far-field pattern of the light beam emitted from connector 51b is shown. The far-field region, or Fraunhofer region, is a region far enough from the source that the diffraction pattern is substantially the same as that at infinity. Fraunhofer diffraction occurs when both a source of light and an observation screen are located at distances from an aperture which are very large compared to a size of the aperture. The far-field pattern of light emitted from an optical fiber changes depending on the type and connection of the optical fiber. The far-field pattern in FIG. 5a is that generated by the optical arrangement shown in FIG. 5b.

The intensity of the emitted light from the optical fiber is roughly Gaussian, with a high amplitude in the center and low amplitude in the periphery. The configuration of light splitter-coupler 23 ensures that more light from connector 51b reaches light receiving array 223 than would otherwise be the case. However, when the truncated conical lens is negative as indicated by negative lens 232 in FIG. 5b, the illumination intensity at light receiving array 223 is lower than the illumination intensity at light receiver 221 as shown in FIG. 5c. As a result, the amount of light from control circuit 10 being converted to electric power in field station 20 is still less than it could be.

Figure 4A:
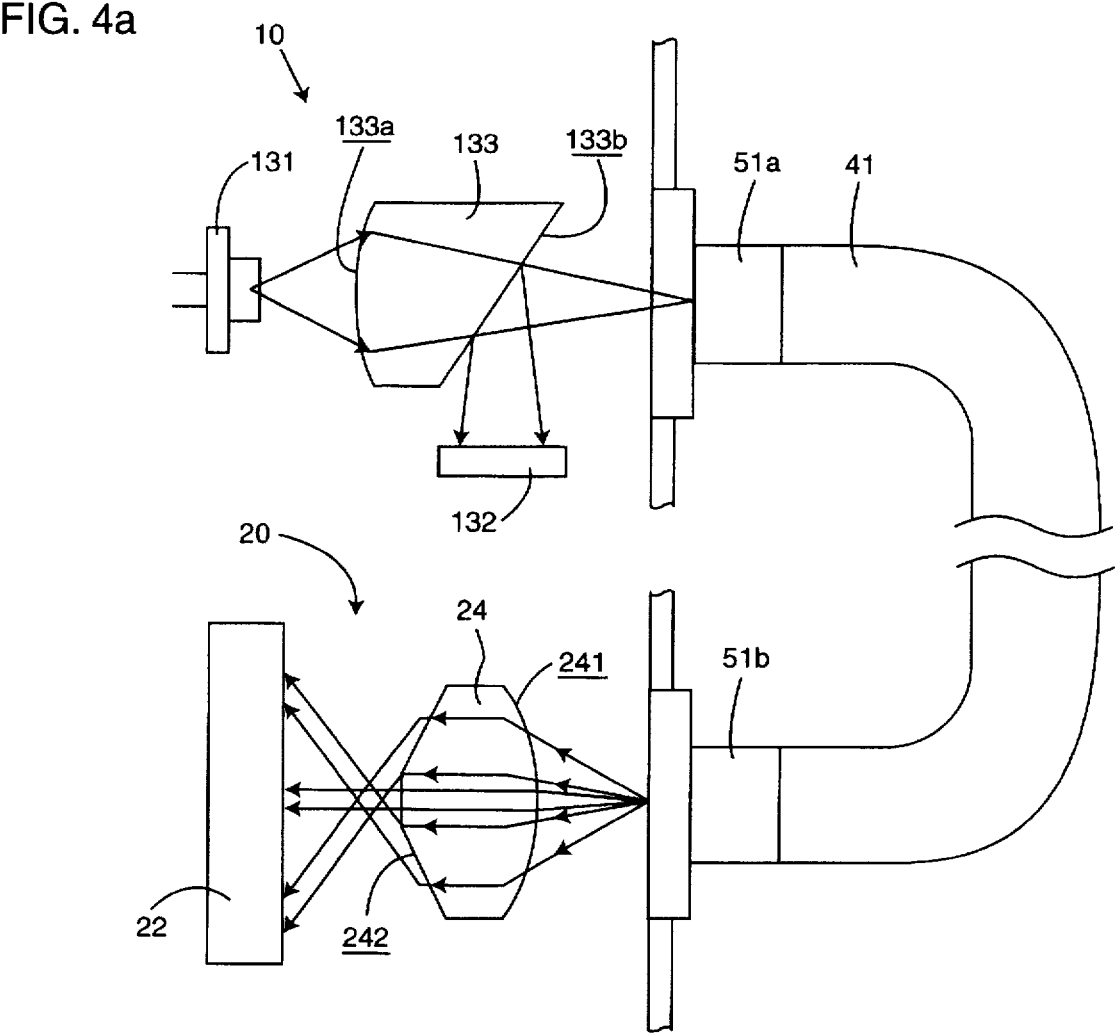
FIG. 4a shows a diagram showing an example of a light splitter-coupler according to a second embodiment of the present invention.
Figure 4B:
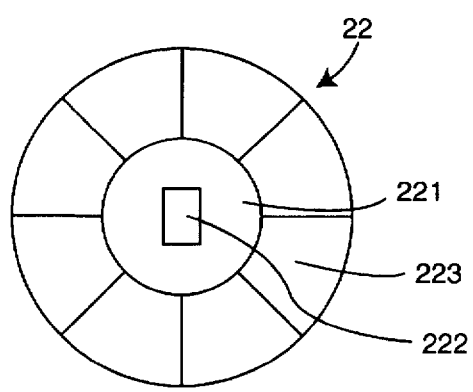
FIG. 4b shows an integrated O-E and E-O converter according to the second embodiment of the present invention.

Referring to FIGS. 4a–4b, a second embodiment of the invention further increases the amount of light being converted to electric power in field station 20. A light splitter-coupler 24 includes a positive lens 241 facing connector 51b and a positive lens 242 facing integrated O-E and E-O converter 22. That is, the truncated conical negative lens 232 of converter 22 in FIG. 2a is replaced by the truncated conical positive lens 242 in FIG. 4a. A far field pattern of the arrangement shown in FIG. 4a is depicted in FIG. 6a.

Figure 5B:
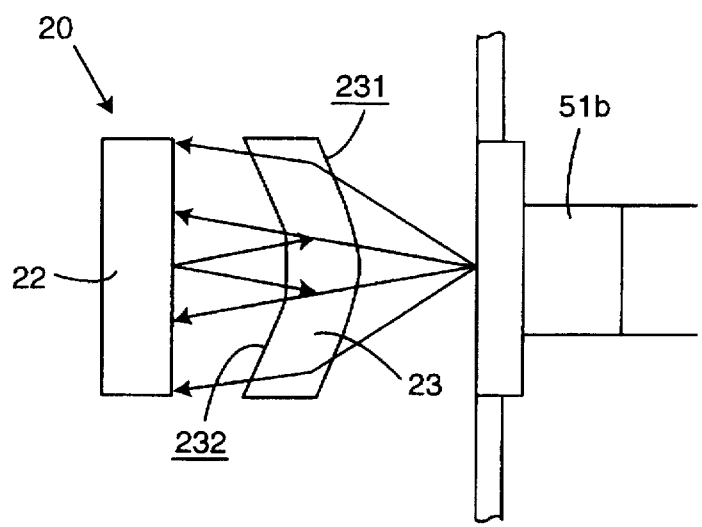
FIG. 5b shows an example of a light splitter-coupler according to the first embodiment of the present invention.
Figure 5C:
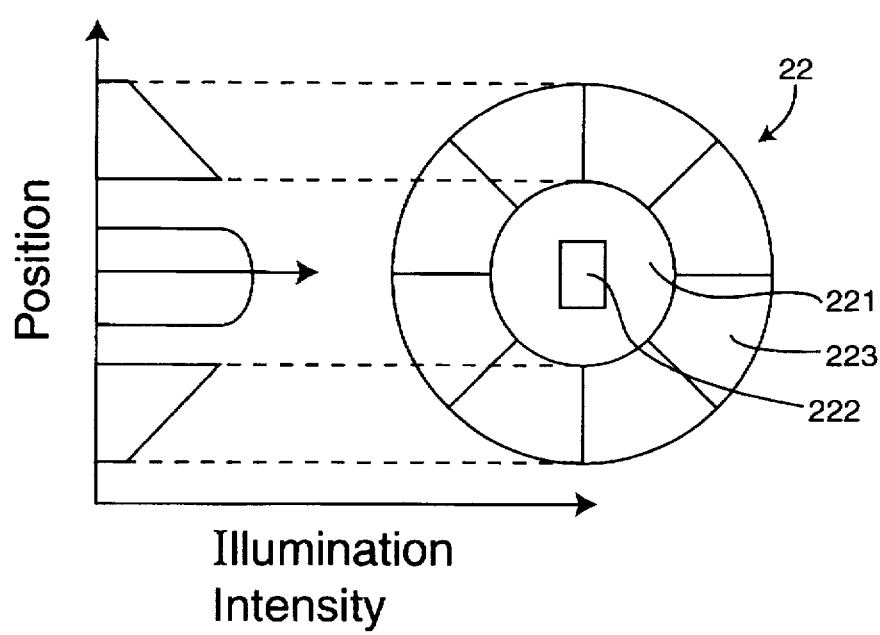
FIG. 5c shows an illumination intensity distribution of light reaching the integrated O-E and E-O converter according to the first embodiment of the present invention.
Figure 6A:
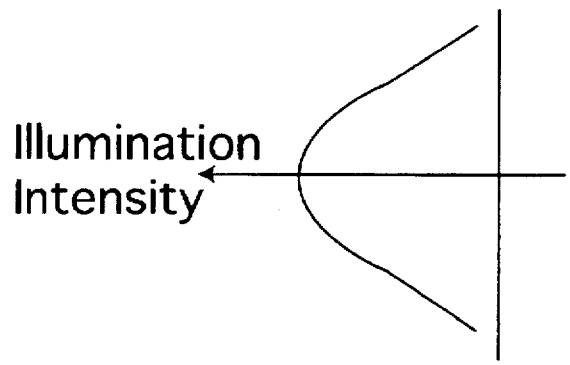
FIG. 6a shows an illumination intensity distribution of a far-field pattern of light emitted from an optical fiber.
Figure 6B:
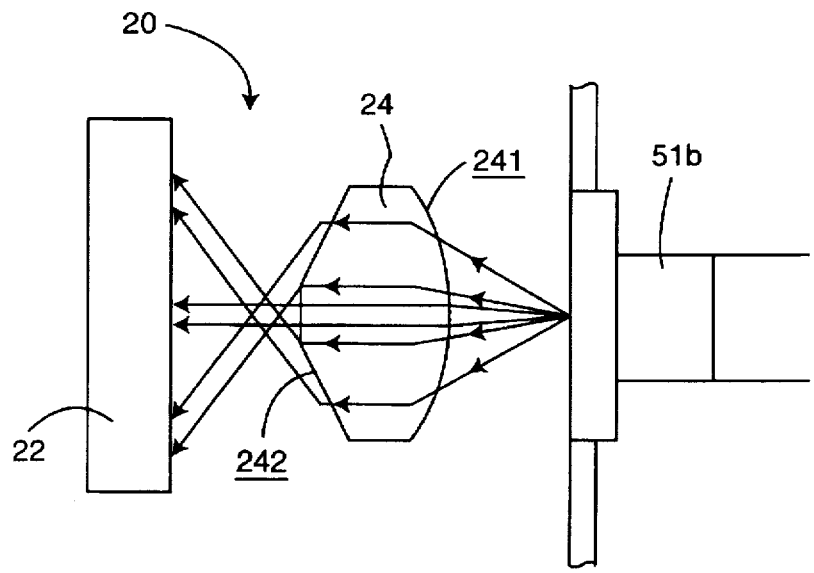
FIG. 6b shows an example of a light splitter-coupler according to the second embodiment of the present invention.
Figure 6C:
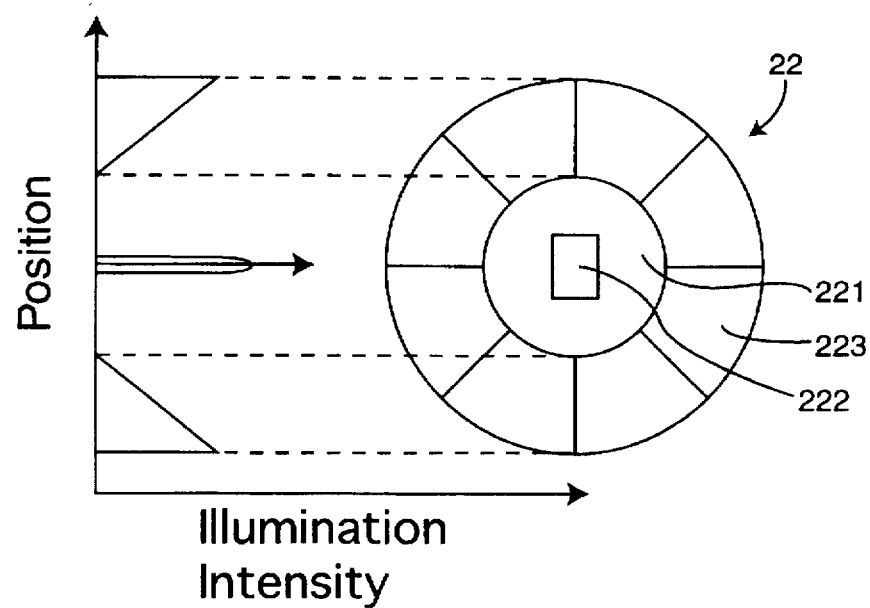
FIG. 6c shows an illumination intensity distribution of light reaching the integrated O-E and E-O converter according to the second embodiment of the present invention.
Figure 7:
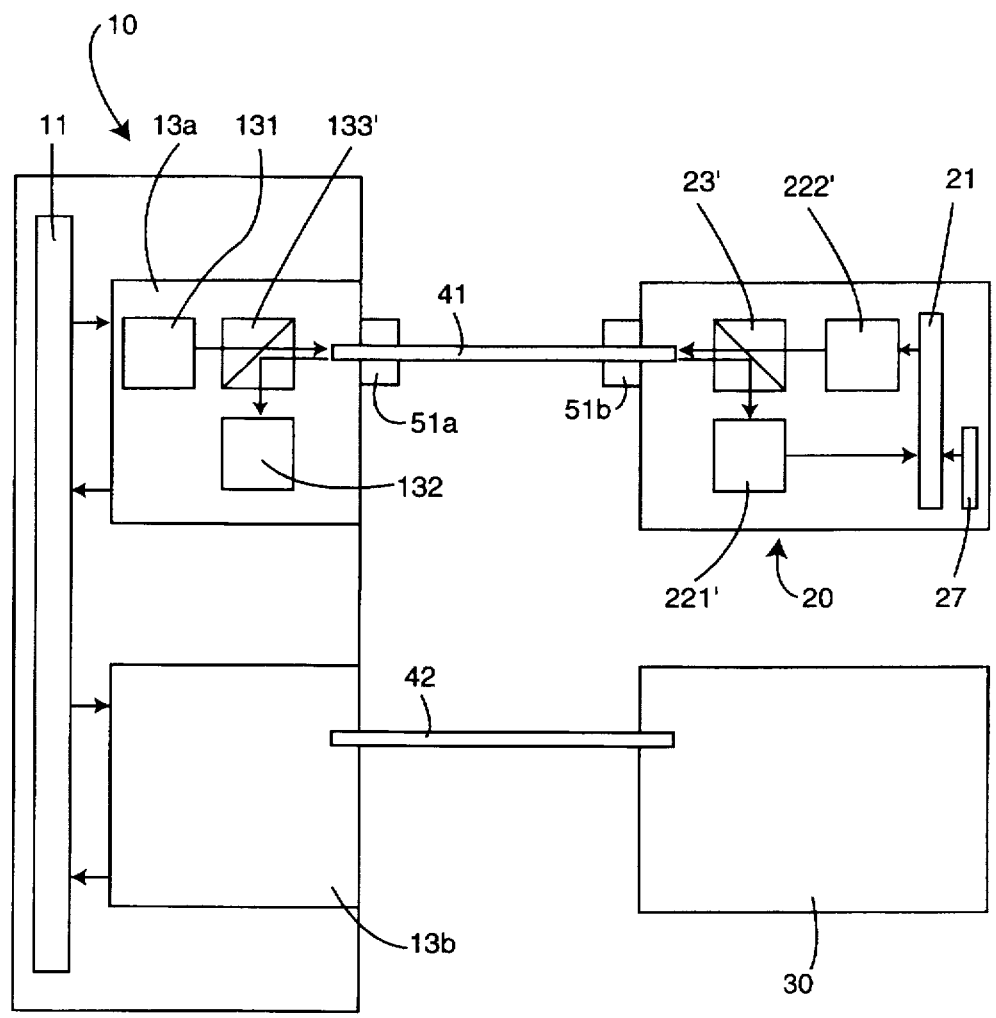
FIG. 7 shows a block diagram of an optical signal transmission apparatus according to the prior art.

Referring to FIGS. 6a–6c, the illumination intensity at integrated O-E and E-O converter 22 of the second embodiment is substantially greater than the illumination reaching the first embodiment shown in FIGS. 5a–5c. When the truncated conical lens is positive, as indicated by positive lens 242 in FIGS. 4a and 6b, the illumination intensity at light receiving array 223 is greater than the illumination intensity at light receiver 221 as shown by the diagram in FIG. 6c. Sufficient light reaches light receiver 221 to pass the signal component of the light beam, while the remainder of the light beam is converted to electric power. Thus, the configuration of FIGS. 4a–4b and 6a–6c facilitates more efficient power conversion than the configuration of FIGS. 2a–2b and 5a–5c.

In the present invention, the battery is eliminated from the bidirectional optical transmission system by optically powering field station 20 with light supplied from control station 10. Thus, the present invention reduces maintenance costs of an optical bidirectional communication system and further facilitates bidirectional communication through the optical fiber between two optical transmission stations.

Although the present invention uses an optical fiber to provide a transmission path between the control station and the field station, the present invention is not limited to this.

It is within the contemplation of the present invention that the optical transmission be through air, or indeed through any combination of gasses, liquids, and solids that are sufficiently transparent to pass enough of the AC signal component and the DC power component of the light beam for the O-E and E-O converter to produce the electric signal and electric power.

Optical fiber 41 is not an essential part of the invention. Any suitable optical transmission path, such as air or liquid, may be used without departing from the spirit and scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A bidirectional optically powered signal transmission apparatus, comprising:
   first and second optical transmission stations;
   first means, in said first optical transmission station, for sending a first light beam on an optical transmission path to said second optical transmission station;
   second means, in said first optical transmission station, for receiving a second light beam sent from said second optical transmission station;
   said first light beam having a first predetermined wavelength;
   said second light beam having a second predetermined wavelength, said first and second predetermined wavelengths being different;
   third means, in said second optical transmission station, for sending said second light beam to said first optical transmission station over said optical transmission path;
   fourth means, in said second optical transmission station, for receiving said first light beam sent from said first optical transmission station;
   said first light beam including an AC signal component superimposed on a DC power component; and
   means, in said second optical transmission station, for converting said DC power component of said first light beam to electric power for powering said second optical transmission station.

2. The apparatus according to claim 1, wherein said first means for sending includes:
   first light source means for radiating said first light beam of said first predetermined wavelength; and
   driving means for regulating said AC signal component.

3. The apparatus according to claim 1, wherein said second means includes:
   a first light splitter-coupler for receiving said second light beam sent from said second optical transmission station; and
   a first light receiver for converting said second light beam received from said first light splitter-coupler to a first electric signal.

4. The apparatus according to claim 3, wherein said first light splitter coupler includes:
   a wavelength selection filter; and
   said wavelength selection filter being selective for said second predetermined wavelength of said second light beam.

5. The apparatus according to claim 1, wherein said fourth means includes:
   a second light splitter-coupler for receiving said first light beam sent from said first optical transmission station; and
   a second light receiver for converting said AC signal component of said first light beam to a second electric signal.

6. The apparatus according to claim 5, wherein said second light splitter-coupler includes:
   a positive lens receiving said first light beam; and
   a truncated conical negative lens facing said second light receiver.

7. The apparatus according to claim 6, wherein said second light splitter-coupler includes:
   a positive lens receiving said first light beam; and
   a truncated conical positive lens facing said second light receiver.

8. A bidirectional optically powered signal transmission apparatus, comprising:
   first and second optical transmission stations;
   first means, in said first optical transmission station, for sending a first light beam on an optical transmission path to said second optical transmission station;
   said first light beam having a first predetermined wavelength and including an AC signal component superimposed on a DC power component;
   said first means including first light source means for radiating said first light beam of said first predetermined wavelength and driving means for regulating said AC signal component;
   second means, in said first optical transmission station, for receiving a second light beam sent from said second optical transmission station;
   said second light beam having a second predetermined wavelength, said first and second predetermined wavelengths being different;
   third means, in said second optical transmission station, for sending said second light beam to said first optical transmission station over said optical transmission path;
   fourth means, in said second optical transmission station, for receiving said first light beam sent from said first optical transmission station;
   means, in said second optical transmission station, for converting said DC power component of said first light beam to electric power for powering said second optical transmission station;
   said third means including a second light source means for radiating said second light beam of said second predetermined wavelength; and
   said first light beam and said second light beam being transmittable simultaneously in opposite directions on said optical transmission path.

9. A bidirectional optically powered signal transmission apparatus, comprising:
   first and second optical transmission stations;
   first light source means, in said-first optical transmission station, for radiating a first light beam having a first predetermined wavelength over an optical transmission path;
   said first light beam including an AC signal component and a DC power component;

driving means for regulating said AC signal component;

a first light splitter-coupler for receiving a second light beam sent from said second optical transmission station;

a first light receiver for converting said second light beam received from said first light splitter-coupler to a first electric signal;

second light source means, in said second optical transmission station, for radiating said second light beam having a second predetermined frequency;

a second light splitter-coupler for receiving said first light beam sent from said first optical transmission station;

a second light receiver for converting said AC signal component of said first light beam to a second electric signal;

means, in said second optical transmission station, for converting said DC component of said first light beam to substantially DC electric power for powering said second optical transmission station; and said second light source means, said second light receiver, and said means for converting being integrally formed as an O-E and E-O converter.

10. The apparatus according to claim 9, wherein said O-E and E-O converter is formed as an integrated circuit.

11. The apparatus according to claim 9, wherein said second light splitter-coupler includes:

a positive lens receiving said first light beam; and a truncated conical negative lens facing said O-E and E-O converter.

12. The apparatus according to claim 9, wherein said second light splitter-coupler includes:

a positive lens receiving said first light beam; and a truncated conical positive lens facing said O-E and E-O converter.

13. A bidirectional optically powered signal transmission apparatus, comprising:

a control station;

means in said control station for superimposing an AC optical signal on a DC optical signal;

a field station;

means in said field station for converting a received optical signal to electrical power for powering said field station;

means in said field station for demodulating said AC optical signal to produce an AC electrical signal;

optical signal means in said field station for generating a further optical signal; and said electrical power being sufficient to satisfy all electrical power needs of said field station including said optical signal means.

* * * * *